(12) United States Patent
Battisti

(10) Patent No.: US 8,200,451 B2
(45) Date of Patent: Jun. 12, 2012

(54) METHOD AND SYSTEM FOR DETECTING THE RISK OF ICING ON AERODYNAMIC SURFACES

(75) Inventor: Lorenzo Battisti, Trento (IT)

(73) Assignee: S.I.SV.EL. S.p.A. Societa Italiana per lo Sviluppo dell'Eletrronica (IT)

( * ) Notice: Subject to any disclaimer, the term of this patent is extended or adjusted under 35 U.S.C. 154(b) by 577 days.

(21) Appl. No.: 12/303,046

(22) PCT Filed: May 29, 2007

(86) PCT No.: PCT/IB2007/001397
§ 371 (c)(1),
(2), (4) Date: Apr. 30, 2009

(87) PCT Pub. No.: WO2007/138450
PCT Pub. Date: Dec. 6, 2007

(65) Prior Publication Data
US 2009/0306928 A1    Dec. 10, 2009

(30) Foreign Application Priority Data
May 31, 2006 (IT) .............................. TO2006A0400

(51) Int. Cl.
*G01N 25/04* (2006.01)
*G06F 19/00* (2011.01)
(52) U.S. Cl. ........ 702/136; 702/130; 702/50; 73/170.26

(58) Field of Classification Search ............... 702/136, 702/50, 130
See application file for complete search history.

(56) References Cited

U.S. PATENT DOCUMENTS

| | | | |
|---|---|---|---|
| 4,327,286 A * | 4/1982 | Thoma | 250/231.1 |
| 5,005,015 A | 4/1991 | Dehn et al. | |
| 6,347,767 B1 * | 2/2002 | Holmen | 244/134 F |
| 6,890,152 B1 | 5/2005 | Thisted | |
| 7,086,834 B2 * | 8/2006 | LeMieux | 416/1 |
| 2005/0242233 A1 * | 11/2005 | Battisti | 244/58 |
| 2007/0154310 A1 * | 7/2007 | Wobben | 416/1 |

FOREIGN PATENT DOCUMENTS

| | | |
|---|---|---|
| EP | 0 657 349 A1 | 6/1995 |
| WO | WO 98/01340 | 1/1998 |
| WO | WO 2004/036038 A1 | 4/2004 |
| WO | WO 2005/020175 A1 | 3/2005 |

\* cited by examiner

*Primary Examiner* — Hal Wachsman
(74) *Attorney, Agent, or Firm* — Cesari and McKenna, LLP; John F. McKenna

(57) ABSTRACT

The invention relates to a method and a system for detecting the risk of icing on aerodynamic surfaces lapped by a fluid flow (F), in particular on load-bearing surfaces of fluid machines, of the type comprising a temperature sensor (20). The system is characterized in that the temperature sensor (20) is located close to the aerodynamic surface (5S) to be monitored for detecting the temperature of the surface (5S), and that the system comprises a rain sensor (30) located close to the surface (5S) for detecting the presence of water on that surface (5S). The system can thus detect the risk of icing on aerodynamic surfaces.

12 Claims, 2 Drawing Sheets

METHOD AND SYSTEM FOR DETECTING THE RISK OF ICING ON AERODYNAMIC SURFACES

The present invention relates to a method for detecting and signalling the risk of icing on aerodynamic surfaces, in particular on load-bearing surfaces of fluid machines, e.g. rotor blades of Wind Energy Converting Systems (WECS).

The invention mainly applies to the WECS field, wherein no solution has yet been found to the problem of forecasting the occurrence of conditions leading to icing on the blades of a wind turbine. This forecast is used for two main purposes, i.e. for detecting icing conditions and stopping the wind turbine, or for activating and deactivating an anti-icing and de-icing system installed on the turbine.

In the aircraft field, a solution has been found for detecting icing conditions by using an icing sensor comprising a small metal cylinder to be exposed to actual atmospheric conditions, which gets covered with ice when icing conditions exist, thus changing its vibration frequency and signaling that icing is occurring. This sensor, marketed under the registered trademark ROSEMOUNT, is installed directly on the wing and is hit by the fluid flow directed against it, so that it provides an accurate indication of the actual icing conditions of the monitored surface.

The same sensor, when used on blades of wind turbines, causes considerable rotor unbalance problems due to the mass of the sensor itself. When installed on fixed surfaces of WECS, e.g. on the nacelle of a wind turbine, it provides unreliable indications about the actual icing occurring on the rotor blades, due to the difference existing between the relative speed of the flow lapping the different sections of the blade and the absolute speed of the wind, detected in a fixed location. In practice, the sensor installed on the nacelle may indicate no icing, while serious icing is occurring on the blade. Also, when the ice sensor begins to send the icing signal, the rotor may already be in heavy icing conditions. The above remarks about that icing sensor also apply, in general, to any known sensor capable of measuring icing directly on fixed surfaces of a WECS.

Known systems adopt a strategy for detecting the presence or risk of icing which is based on the detection of machine parameters and atmospheric conditions. For example, they measure either tower vibrations and ambient temperature or power output and ambient temperature, as shown in patent documents US 20050276696 and U.S. Pat. No. 6,890,152. The logic of such strategies is to deduce the occurrence of the icing phenomenon by detecting an anomalous behaviour of the wind turbine, such as too much vibration or a power output drop, at the same time verifying environmental parameters, e.g. checking that ambient temperature is below 0° C.

The above-mentioned known systems have the main drawback consisting of being unreliable in effectively forecasting and detecting the presence of ice, as soon as the icing phenomenon occurs. As a matter of fact, when icing is detected the phenomenon may already be so advanced as to require the wind turbine to be stopped in order to prevent if from being damaged; or else conditions may arise when there is only a remote risk of icing, but the system signals that icing is about to occur. For example, when turbulent events or strong wind changes (which are typical of mountain areas) bring about anomalous vibration phenomena and a temperature below 0° C. is detected, the system will stop the turbine even though no icing conditions exist, since the operating environment is not sufficiently humid.

According to documents U.S. Pat. No. 5,005,015 and EP 1 466 827, sensors for detecting the presence of water or ice are also known to be applied directly to aerodynamic surfaces, in particular to engine blades. These systems can only detect the presence or the thickness of water or ice possibly being present on the surfaces, but they cannot forecast future icing.

SUMMARY OF THE INVENTION

The present invention aims at solving the above-mentioned prior art drawbacks by providing a method for detecting the risk of icing on aerodynamic surfaces which can actually and effectively forecast the occurrence of water icing conditions on aerodynamic surfaces, in particular on the blades of a wind turbine. The invention also comprises a system for implementing that method.

It is an object of the present invention to provide a system which is simple, inexpensive and absolutely effective whatever the operating conditions of the aerodynamic surfaces on which the risk of icing is to be detected.

According to the present invention, the objects are achieved through a method and a system for detecting the risk of icing on aerodynamic surfaces having the features as set out in the appended claims.

The system comprises a temperature sensor and a sensor for detecting the presence of water or ice, which are installed in the immediate vicinity of the aerodynamic surface on which the risk of icing is to be detected, in order to detect both the temperature and the presence of water on the same surface. Therefore, the sensing portions of the respective sensors are installed so that the actual conditions of the monitored aerodynamic surface can be detected.

The detection of temperature and of the presence of water obtained directly on the concerned surface allows to monitor the risk of icing in an effective manner. For example, when the presence of drops of water is detected together with a temperature below a preset critical temperature, i.e. a temperature at which the risk of impending icing is to be signalled (e.g. 3° C.), the system according to the invention can signal an actual danger of icing.

The system according to the invention can also verify empirically whether, in combination with the actual surface temperature, water drops are really forming on the surface, thus determining whether the risk of icing is real or not. For example, if there is a temperature between −1° and 1° C. and there is no water on the monitored surface, the system according to the invention can abstain from signalling the risk of icing, as indeed is the case when air humidity is very low.

Advantageously, the sensors are arranged on the aerodynamic surface to be monitored in positions corresponding to or surrounding the areas of maximum pressure of the fluid flow, i.e. those areas of the aerodynamic surface where the risk of icing is highest. For example, such a position may be the leading edge of a wing or a rotor blade surface.

Furthermore, the sensors are arranged on the aerodynamic surface close to each other, so that homologous conditions of the fluid flow can be detected in very close locations. This greatly prevents wrong detections of the actual condition of the fluid flow hitting the surface in a certain point. From this point of view, the ideal solution is to use a sensor which includes the functions for detecting the presence of water or ice as well as the functions for measuring the temperature of a same small surface.

DESCRIPTION OF A PREFERRED EMBODIMENT

Figure 1:
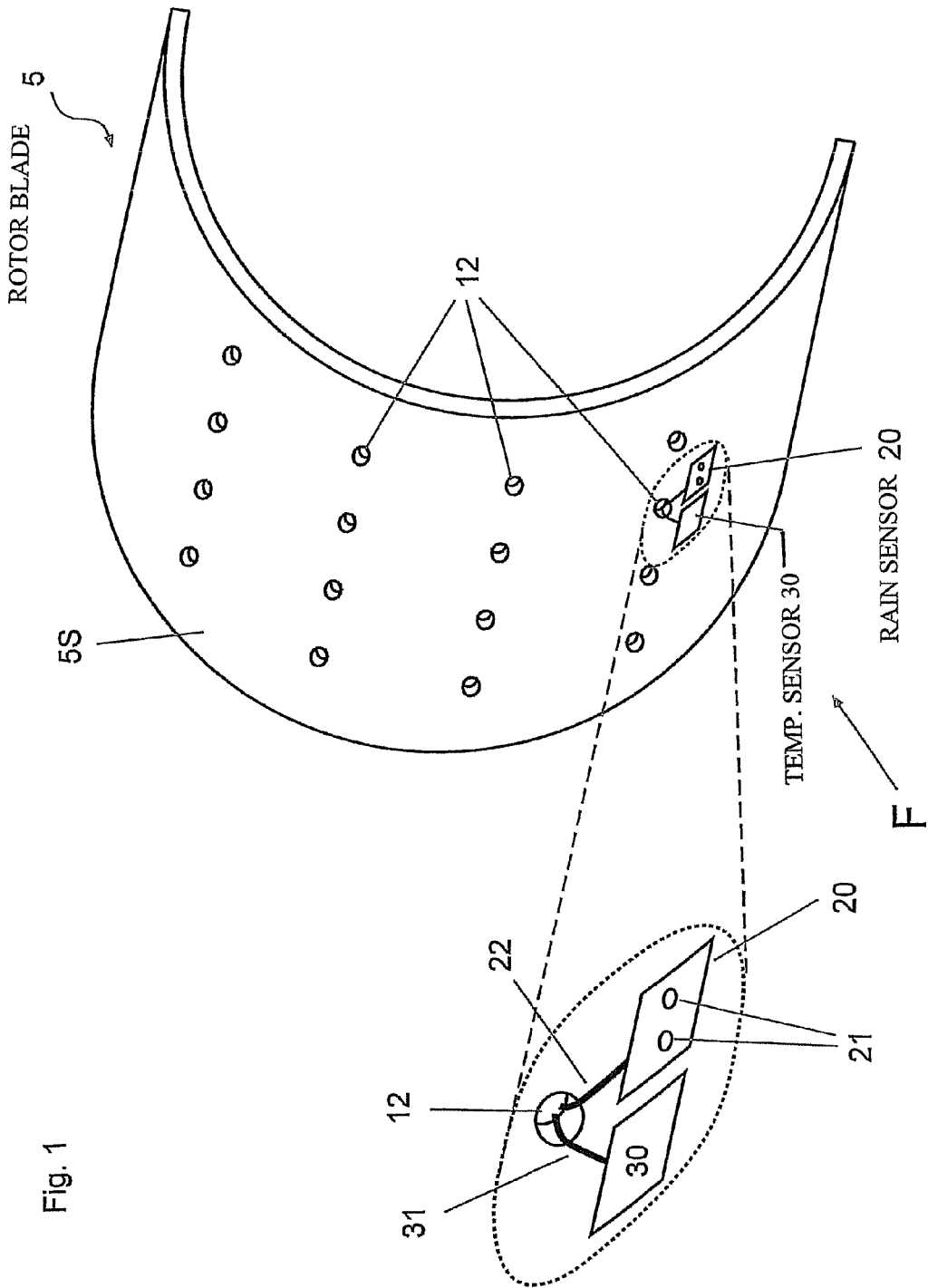
FIG. 1 is a perspective view of the system according to the invention applied to a section or keystone of a rotor blade.

In particular, the rotor blade section shown and designated by reference numeral 5 is of the type illustrated in document WO 2004/36038 in the name of the same Applicant of the present patent application. The blade 5 is therefore provided with holes 12 on its outer surface 5S. Near the leading edge of the blade profile and of the hole 12, and on the outer surface of the blade 5S, there are a first weather sensor, in this case a temperature sensor 20, and a second weather sensor, in this case a sensor for detecting the presence of water or ice 30, hereafter simply referred to as rain sensor. With reference to the direction of the fluid flow F lapping the blade 5, these sensors 20, 30 are located upstream of the hole 12, so that the respective readings are not affected by the fluid flow coming out of the hole.

The temperature sensor 20, e.g. a thermocouple, is a small, light unit of a known type, shaped as a thin plate and fitted with a sensing portion 21, which is installed so as to intercept the fluid flow lapping the outer surface 5S. The sensor is located upstream of the hole 12, and is glued or otherwise secured to the outer surface 5S. On the rear side, it has an electric connection 22 running along the inner surface of the blade 5 up to a data acquisition system (DAS), not shown for simplicity's sake.

The DAS is of a known type and advantageously arranged, for inertial purposes, outside the rotor blade, for example on the nacelle of the WECS, and the system according to the present invention includes known means for transmitting the signals detected by the sensors to the DAS.

The rain sensor 30, of a type similar to those installed on automotive windshields, is also glued upstream of the hole 12 and fitted with a respective electric connection 31 running along the side walls of the hole and the inner surface of the blade 5 up to the DAS. The sensors 20, 30 employed are known and, once installed on the outer surface 5S, their shapes and dimensions do not affect the flow F against the surface.

The DAS can process the information about the presence/absence of water sensed by the rain sensor 30 and the surface temperature value detected by the temperature sensor 20 so that, when drops of water are not detected on the surface, it will not signal the risk of icing. On the contrary, when the presence of water is detected together with a temperature below a preset critical value, e.g. 3° C., the DAS will signal the risk of icing or impending icing to a central control unit.

Advantageously, the low weight, the simplicity and the reliability of known rain sensors and temperature sensors allow them to be easily employed also on rotary blades of wind turbines, thus providing a system for detecting the risk of icing on aerodynamic surfaces which is simple, reliable and inexpensive.

Unlike the prior art, the system according to the invention performs a detection of a pair of physical parameters, in particular temperature and presence of water, directly on the surfaces concerned by the risk of icing, thus providing a timely and accurate measurement. Those parameters, after being processed by the DAS, allow to forecast the actual risk of icing in an effective manner. On the contrary, according to the prior art the risk of icing is essentially forecasted on the basis of parameters which are not measured on the surface to be monitored, in that they are derived and processed by sensors often located far from the involved surfaces. Therefore, such measurements are in several instances wrong and do not represent actual surface conditions.

Figure 2:
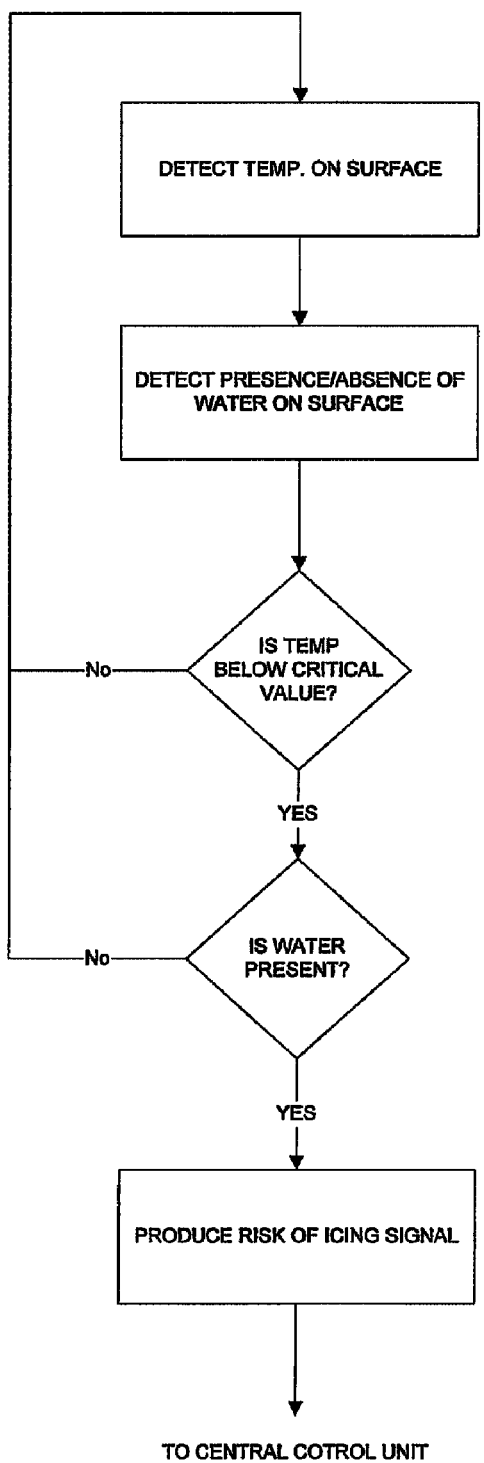
FIG. 2 is a flow chart showing a method of detecting the risk of icing on aerodynamic surfaces according to the invention.

In short, the system for detecting the risk of icing on aerodynamic surfaces according to the invention allows to signal the risk of icing and possibly to activate an anti-icing system very accurately and effectively, without risking that icing has already occurred on the concerned aerodynamic surfaces, thus keeping the monitored machine always in the best operating conditions. The FIG. 2 flow chart describing the method steps is self explanatory.

It is clear that many changes may be made by the man skilled in the art to the system for detecting the risk of icing on aerodynamic surfaces, in particular on load-bearing surfaces of fluid machines, according to the present invention; likewise, it is also clear that in the practical implementation of the invention, the details herein illustrated may have different shapes or be replaced with equivalent technical elements.

For example, if the system is applied to rotor blades without holes, suitable holes may be made for routing the electric connections of the sensors or for housing the sensors themselves, which in any case are to be configured and installed so that the sensing portion thereof lies on the surface to be monitored.

Also, when relatively thick sensors are used, suitable openings may be obtained in the blade for housing said sensors without affecting the fluid flow around the blade.

The invention claimed is:

1. A method for detecting the risk of icing on aerodynamic surfaces of a machine part exposed to the weather comprising the steps of:
   detecting the temperature on said aerodynamic surfaces of said machine part to produce temperature data;
   detecting the presence/absence of water in a liquid state on said aerodynamic surfaces of said machine part to produce presence/absence of water data
   processing the temperature and presence/absence of water data to generate a risk of icing signal only when water in a liquid state is present on said aerodynamic surfaces of said machine part and the temperature of said aerodynamic surfaces of said machine part is below a preset critical value, and
   responding to said risk of icing signal to avoid icing on said aerodynamic surfaces of said machine part.

2. The method according to claim 1, wherein said machine part is a wind turbine rotor.

3. A system for detecting the risk of icing, said system comprising
   a machine part having an aerodynamic surface;
   a temperature sensor located on said aerodynamic surface of said machine part for detecting the temperature thereof and producing corresponding temperature data;
   a rain sensor located on said aerodynamic surface of said machine part for detecting the presence/absence of water in a liquid state on said aerodynamic surface of said machine part and producing corresponding presence/absence of water data, and
   a data acquisition system connected to said sensors which processes said temperature and said presence/absence of water data to provide a risk of icing signal only when water in a liquid state is present on said aerodynamic surface of said machine part and the temperature of said aerodynamic surface of said machine part is below a preset critical value.

4. The system according to claim 3, wherein, when the sensors detect the presence of water in a liquid state and a temperature below said preset critical value, the data acquisition system sends a said risk of icing signal to a central control unit which initiates action to protect said machine part.

5. The system according to claim 3, wherein said sensors are arranged in positions corresponding to or surrounding the areas of maximum pressure at said aerodynamic surface of said machine part.

6. The system according to claim 3, wherein the temperature sensor has a sensing portion exposed to the temperature of said aerodynamic surface of said machine part.

7. The system according to claim 3, wherein said sensors are arranged on said aerodynamic surface of said machine part close to each other.

8. The system according to claim 7, wherein said sensors are composed of small plates and are secured to said aerodynamic surface of said machine part.

9. The system according to claim 3, wherein said sensors are combined in a single unit.

10. The system according to claim 3, wherein said aerodynamic surface is the outer surface of said machine part of a rotor blade on a wind turbine.

11. The system according to claim 10, wherein said rotor blade is of a holed type and said sensors are located upstream of a single hole in said aerodynamic surface of said rotor blade.

12. The system according to claim 10,
wherein said data acquisition system is arranged on the nacelle of the wind turbine, and includes a transmitter for transmitting said temperature and said presence/absence of water data to a central control unit which initiates action to protect the rotor blade from icing.

* * * * *